United States Patent [19]
Nguyen

[11] Patent Number: 5,995,848
[45] Date of Patent: Nov. 30, 1999

[54] SYSTEM AND METHOD OF COMPLETING CALLS TO BUSY MOBILE SUBSCRIBERS IN A RADIO TELECOMMUNICATIONS NETWORK

[75] Inventor: Viet Anh Nguyen, Montreal, Canada

[73] Assignee: Telefonaktiebolaget LM Ericsson, Stockholm, Sweden

[21] Appl. No.: 08/897,731

[22] Filed: Jul. 21, 1997

[51] Int. Cl.⁶ .................................................. H04B 7/00
[52] U.S. Cl. .......................... 455/528; 455/414; 455/510
[58] Field of Search .................................. 455/414, 433, 455/458, 560, 528, 510, 466, 461

[56] References Cited

U.S. PATENT DOCUMENTS

| | | | |
|---|---|---|---|
| 5,287,551 | 2/1994 | Gustafson, Jr. et al. | 455/54.1 |
| 5,313,517 | 5/1994 | Inaguma | 379/67.1 |
| 5,353,331 | 10/1994 | Emery et al. | 455/461 |
| 5,406,616 | 4/1995 | Bjorndahl | 379/59 |
| 5,479,495 | 12/1995 | Blumhardt | 379/207 |
| 5,504,804 | 4/1996 | Widmark et al. | 455/414 |
| 5,521,965 | 5/1996 | D'Alessio et al. | 379/88.25 |
| 5,533,100 | 7/1996 | Bass et al. | 379/88.06 |
| 5,579,372 | 11/1996 | Astrom | 455/412 |
| 5,627,875 | 5/1997 | Kapsales | 455/414 |
| 5,692,033 | 11/1997 | Farris | 379/67.1 |
| 5,701,295 | 12/1997 | Bales et al. | 370/271 |
| 5,761,289 | 6/1998 | Keshav | 379/201 |
| 5,764,746 | 6/1998 | Reichelt | 379/207 |
| 5,768,359 | 6/1998 | DiPierro, Jr. et al. | 379/209 |
| 5,781,858 | 7/1998 | Lantto et al. | 455/414 |
| 5,784,438 | 7/1998 | Martinez | 379/67.1 |

OTHER PUBLICATIONS

Frank Salm and Dave Gerads; "Exploring Intelligent Network Control of Active Calls on a Co Switch"; Proceedings of the International Conference on Communications (ICC), Geneva; May 23, 1993; vol. 3; pp. 1558–1562.

*Primary Examiner*—Nguyen Vo
*Assistant Examiner*—Charles N. Appiah
*Attorney, Agent, or Firm*—Smith & Danamraj, P.C.

[57] ABSTRACT

A method and system of completing calls to busy mobile subscribers in a radio telecommunications network. The system includes a gateway mobile switching center (G-MSC) to provide switching functions to a mobile station (MS) in a home service area, a home location register (HLR) providing a location of the MS to the G-MSC, a visitor mobile switching center (V-MSC) to provide switching functions to the MS when the MS roams outside the home service area, and a service control point (SCP) which includes service logic for periodically initiating a call attempt to the MS to determine if the MS is busy. When the calling party attempts to call a busy MS, the calling party may request an automatic callback service. The G-MSC releases all trunks from the calling party and the MS and notifies the SCP. The SCP periodically initiates a call attempt to ascertain whether the MS is idle. Upon determining that the MS is idle, the G-MSC connects the call between the calling party and the MS.

18 Claims, 15 Drawing Sheets

SYSTEM AND METHOD OF COMPLETING CALLS TO BUSY MOBILE SUBSCRIBERS IN A RADIO TELECOMMUNICATIONS NETWORK

BACKGROUND OF THE INVENTION

1. Technical Field of the Invention

This invention relates to radio telecommunication systems and, more particularly, to a system and method of completing calls to busy mobile subscribers in a radio telecommunications network.

2. Description of Related Art

With the widespread growth of radio telecommunications services, mobile subscribers demand increased capabilities found in land-based Public Switched Telephone Network (PSTN) systems. One such service offered in PSTN based systems is automatic callback which enables a calling party to connect with a busy called party, once the called party can accept calls (i.e., when the called party finishes his first call).

However, there are obstacles preventing the optimal use of this automatic callback service for subscribers in a radio telecommunications network. First, difficulties arise in locating a mobile station (MS), since the MS can travel a considerable distance between calls. Second, in order to efficiently provide an automatic callback service for mobile subscribers, the impact upon the entire radio telecommunications network must be minimized. Adding a service for a relatively small number of MSs which requires extensive changes to the entire radio telecommunications network, is not cost effective for system operators. Therefore, the callback service must not require drastic change across the entire radio telecommunications network. In addition, the use of call connections, known as trunks, should also be minimized during the automatic callback process since these are valuable system resources. The service becomes expensive if too many resources are required to implement this service. Therefore, the implementation and actual use of the automatic callback service in radio telecommunications networks must be capable of locating the MS, while efficiently utilizing network resources.

Although there are no known prior art teachings of a solution to the aforementioned deficiency and shortcoming such as that disclosed herein, prior art references that discusses subject matter that bears some relation to matters discussed herein are U.S. Pat. No. 5,406,616 to Bjorndahl (Bjorndahl) and U.S. Pat. No. 5,287,551 to Gustafson, Jr. et al. (Gustafson).

Bjorndahl discloses a method of effecting automatic callback in a mobile telecommunications system. A centrally located home location register (HLR) keeps an account of where all mobile stations registered in the mobile telecommunications network are located, with the aid of local databases called visitor location registers (VLRs). A gateway mobile switching center (G-MSC) provides switching functions to mobile stations within its operating area and an interface between the PSTN and the Public Land Mobile Network (PLY). Upon a mobile station exiting the service area of its home MSC, a visiting mobile switching center (V-MSC) provides control and switching functions for the mobile station within a defined service area controlled by the V-MSC.

The calling party (who may be located within the PSTN or the PLMN) calls the called mobile subscriber, which causes a trunk to be seized from the G-MSC to the V-MSC, and finds that the subscriber is busy. The calling party then dials a code which results in a reference being stored in a queue in the HLR. When the called mobile subscriber is free to receive a call, the calling party is informed of the idle status of the mobile station by an announcement machine typically found in mobile switching centers. The calling party then lifts his telephone receiver and a connection is completed between the two subscribers. While waiting for the called subscriber to become available, the trunk from the G-MSC to the V-MSC remains tied up.

There are several disadvantages to the Bjorndahl method. First, the continued utilization of the trunk during the entire automatic callback process wastes this valuable network resource. Additionally, all mobile switching centers which might interact with the MS must be modified for the automatic callback service to keep the trunk established even though the MS is not currently available. Thus, Bjorndahl does not teach or suggest a system or method of effecting an automatic callback while minimizing the utilization of network resources and reducing the required modifications to the existing radio telecommunications network.

Gustafson discloses an apparatus and method for issuing busy callbacks on a voice channel to busied communication units on a trunked radio communication system. A control resource issues a busy signal to a communication unit when a requested communication unit is unavailable. The radio communication unit receiving the busy signal may still participate in a second communication while in a busied state. The resource controller is capable of allowing the busied communication unit to participate in a second communication unit on a second communication resource and issuing the call-back signal during the second communication. However, Gustafson requires that at least one trunk be maintained during call-back from the busy communication unit. Additionally, significant modifications are necessary to implement this busy call back system into current radio telecommunication networks. Thus, Gustafson does not teach or suggest a system or method of effecting an automatic callback while minimizing the utilization of network resources and reducing the required modifications to the existing radio telecommunications network.

Thus, it would be a distinct advantage to have a system and method for effecting automatic callback which minimizes the resources of the radio telecommunications network while reducing any required modifications to the existing radio telecommunications.

SUMMARY OF THE INVENTION

In one aspect, the present invention is a system in a radio telecommunications network for completing a call from a calling party to a called mobile station which is busy when the call is first attempted. The system comprises an originating mobile switching center (O-MSC) where the call enters the radio telecommunications network. The O-MSC includes a service switching function (SSF). The system also includes a visiting mobile switching center (V-MSC) where the called mobile station is operating. The V-MSC including means for determining whether the called mobile station is busy. Additionally, the system includes means for notifying the O-MSC whether the called mobile station is busy and a service control function (SCF) associated with the O-MSC. The SCF includes service logic for periodically initiating a call attempt to the called mobile station via the SSF without utilizing a trunk between the O-MSC and the V-MSC. The system also includes means within the O-MSC for informing the SCF whether the mobile station is busy and means for completing the call upon determining that the called mobile station is idle.

In another aspect, the invention is a system in a radio telecommunications network for completing a call from a calling party to a called mobile station which is busy when the call is first attempted. The system comprises a mobile switching center (MSC) that performs switching and call connecting functions for the calling subscriber and the called mobile station. The MSC including means for determining whether the called mobile station is busy and a service control point (SCP) associated with the MSC. The SCP includes service logic for periodically initiating a call attempt to the called mobile station via the MSC. The system also includes means within the MSC for informing the SCP whether the called mobile station is busy and means for completing the call upon determining that the called mobile station is idle.

In another aspect, the present invention is a method in a radio telecommunications network of completing a call from a calling party to a called mobile station (MS) which is busy when the call is first attempted. The MS operates in a service area of a visiting mobile switching center (V-MSC). The method begins by the calling party attempting a call to the MS. The gateway mobile switching center (G-MSC), which has a home service area from which the call enters the radio telecommunications network, determines whether the MS is busy. Next, the calling party sends a request for call completion to a service control point (SCP) associated with the G-MSC, upon determining that the MS is busy. Next, the G-MSC releases all trunks between the calling party and the MS. The SCP then periodically initiates a call attempt to the MS via the G-MSC to determine a busy status of the MS. Next, it is determined whether the MS is in the busy status. Then a first trunk is established from the G-MSC to the V-MSC where the MS is operating, upon determining that the MS is idle. Next, an alerting signal is sent to the MS. Once the MS answers the alerting signal, the MS is informed to wait for call completion. Next, a second trunk is established from the G-MSC to the calling party. The calling party is informed to wait for call completion and the first trunk is joined to the second trunk to establish a call delivery from the calling party to the MS.

In still another aspect, the present invention is a method in a radio telecommunications network of completing a call from a calling party to a called mobile station (MS) which is busy when the call is first attempted. The MS operates in a home service area of a mobile switching center (MSC). The calling party attempts a call. Then the MSC determines if the MS is busy. The calling party sends a request for call completion to a service control point (SCP) associated with the MSC, upon determining that the MS is busy. The MSC releases all trunks between the calling party and the MS. Periodically, the SCP initiates a call attempt to the MS via the MSC to determine the busy status of the MS. When it is determined that the MS is idle, an alerting signal is sent to the MS. Next, when it is detected that the MS answered the alerting signal, the MS is informed to wait for call completion. Next, a trunk is established from the MSC to the calling party and the calling party is informed to wait for call completion. Then call delivery is established from the calling party to the MS.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

The present invention is a system and method of completing calls to busy mobile subscribers in a radio telecommunications network.

Figure 1:
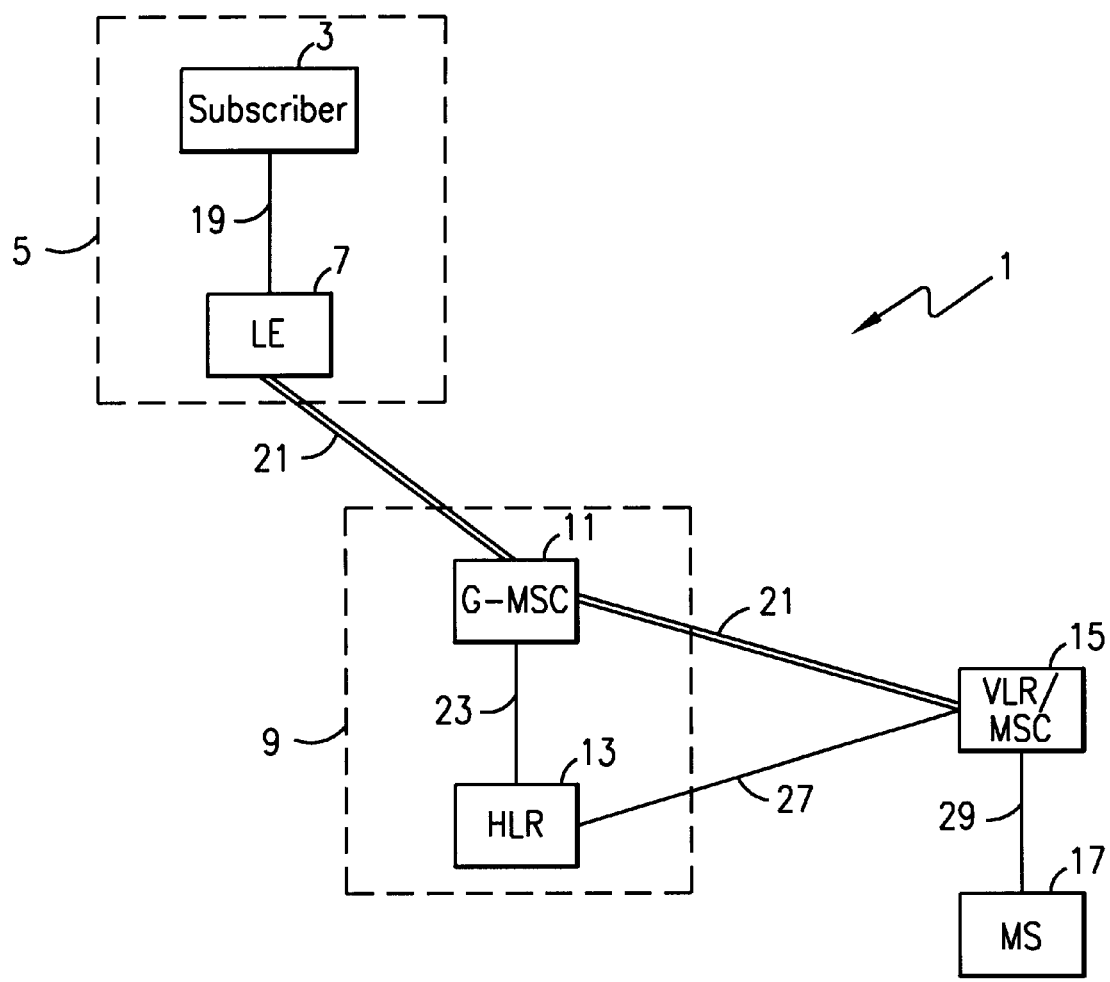
FIG. 1 (Prior Art) is a simplified block diagram of an existing system providing automatic callback service in a radio telecommunications system.

FIG. 1 is a simplified block diagram of an existing system providing automatic callback service in a radio telecommunications system. The existing system 1 includes a subscriber 3 located in a public switched telephone network (PSTN) 5 having a local exchange (LE) 7. The existing system 1 also includes a home service area 9 associated with a gateway mobile switching center (G-MSC) 11 and a home location register (HLR) 13. Additionally, the existing system includes a visitor location register/mobile switching center (VLR/MSC) 15, a mobile station (MS) 17, trunks 19–21, and communication links 23–29.

The subscriber 3 is a wireline-based party operating within the PSTN 5. The subscriber 3 is the party originating a call to the MS 17. The MS 17 is a mobile station which may or may not operate within the home service area 9. As depicted in FIG. 1, the MS 17 is outside the home service area 9.

Within the PSTN 5 is the LE 7 which provides the switching functions within the PSTN 5 for the subscriber 3. Within the home service area 9 is the G-MSC 11, which provides the switching functions for the MS 17. Additionally, the home service area 9 includes the HLR 13, which is a database identifying all mobile stations subscribing to the home service area 9.

The subscriber 3 calls the MS 17 and attempts to establish a call connection. The subscriber 3 is informed that the MS 17 is busy with another call, by means of a busy tone (e.g. a rapid sequence of short tone signals). The subscriber 3 then dials a code requesting an "automatic callback when busy" service. The service request is sent-from the subscriber 3 to the LE 7 via communications link 25. A message requesting the completion of the call is sent from the LE 7 to the HLR 13 through the G-MSC 11. The HLR 13, which knows in which visitor location register the MS 17 is registered at that moment in time, diverts the request for call completion to the VLR/MSC 15. The VLR/MSC 15 sends a confirmation message to the LE 7, through the G-MSC 11 indicating that the request for call completion has been received. The subscriber 3 is informed of the confirmation of the request for call completion by the cessation of the busy tone. Thereafter, the subscriber 3 may release his connection with the LE 7 by replacing his telephone receiver. However, the trunk 21 established between the G-MSC 11 and the VLR/MSC 15 and the trunk 19 between the G-MSC 11 and the LE 7 must be maintained. When the MS 17 is free to accept calls (i.e., when the ongoing call to the MS 17 has ended), the MS 17 informs the VLR/MSC 15 that the MS 17 is free to accept calls. The VLR/MSC 15 sends a "subscriber free" message to the HLR 13, via communications link 27. The HLR 13 then communicates with the LE 7 via the G-MSC 11, to establish the location of the MS 13 and the availability to receive a call. The LE 7 informs the subscriber 3 that the MS 17 is free to accept calls. When the subscriber 3 lifts his telephone receiver, a call is sent to the MS 17. Upon the MS 17 answering his telephone, the call connection is complete.

Although an automatic callback service is available with the existing system 1, there are several disadvantages. First, in order to implement this service for the MS 17, major and costly modifications must be made to several nodes within the telecommunications network, both inside and outside the home service area 9. The G-MSC 11 and HLR 13 must be modified in order to receive the signaling messages necessary to use the automatic callback service. In addition, the VLR/MSC 15 where the MS 17 is presently operating must be modified in order to receive this service. Each VLR/MSC in which the MS 17 may roam must be modified for the automatic callback service. Therefore, the entire radio telecommunications network must be modified, thereby impacting the entire telecommunications network from which the MS 17 may operate. Another major shortcoming in the existing system 1 is that the trunk between the G-MSC 11 and the LE 7 must be maintained during the automatic callback process. Additionally, the trunk must be maintained between the G-MSC 11 and the VLR/MSC 15 during the automatic callback process. The utilization of several trunks for the entire callback period is costly and an inefficient use of scarce network resources.

Figure 2:
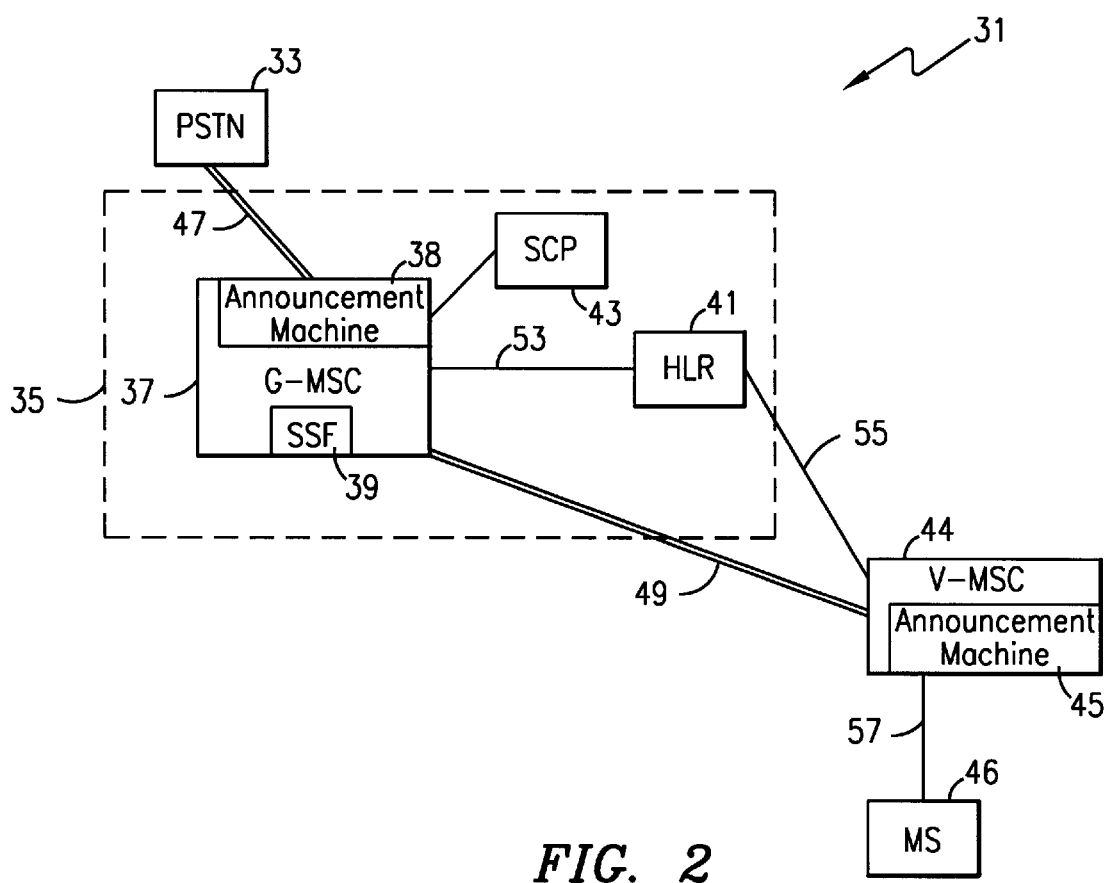
FIG. 2 is a simplified block diagram illustrating the components of a telecommunications system in the preferred embodiment of the present invention.

FIG. 2 is a simplified block diagram illustrating the components of a telecommunications system in the preferred embodiment of the present invention. The telecommunications system 31 includes a PSTN 33, and a home service area 35 associated with a G-MSC 37, an announcement machine 38, a service switching function (SSF) 39, a HLR 41, and a Service Control Point (SCP) 43. Additionally, the telecommunications system includes a visiting mobile switching center (V-MSC) 44 having an announcement machine 45, a MS 46, trunks 47–49, and communications links 51–57.

The home service area 35 is the service area associated with the G-MSC 37 from which the MS 46 originates. The MS 46 may or may not be within the home service area 35. As depicted in FIG. 2, the MS 46 has roamed outside the home service area 35. The home service area 35 includes the G-MSC 37. The announcement machine 38 is normally co-located with the G-MSC 37, however the announcement machine 38 may be physically separated from the G-MSC 37. An Intelligent Network (IN) provides various services to a mobile subscriber. However several additional nodes are required in an IN. The first is the SSF 39 which may or may not be located with the G-MSC 37. In FIG. 2, the SSF 39 is co-located with the G-MSC 37. The SSF 39 provides the ability to switch services within an Intelligent Network (IN). Another node required for services within an IN is the SCP 43, which is also located within the home service area 35. The SCP 43 includes service logic which implements selected IN services and may be stand-alone or co-located with the HLR 41. In an alternate embodiment, the functionality of the SCP 43 could be incorporated into a service control function co-located with the G-MSC 37, thereby doing away with the requirement for a SCP 43. The HLR 41 includes a database of subscriber information for registered mobile subscribers based within the home service area 35, and in particular, for the MS 46. The MS 46 is shown to have roamed within the area controlled by the V-MSC 44, providing switching functions for the MS 46. However, the MS 46 may be located within the service area 35, whereby the V-MSC 44 is not needed. Additionally, although FIG. 2 depicts the calling party from the PSTN 33, the calling party may also be a mobile subscriber within the PLMN. Thus, the G-MSC may actually be an originating mobile switching center.

Figure 3A:
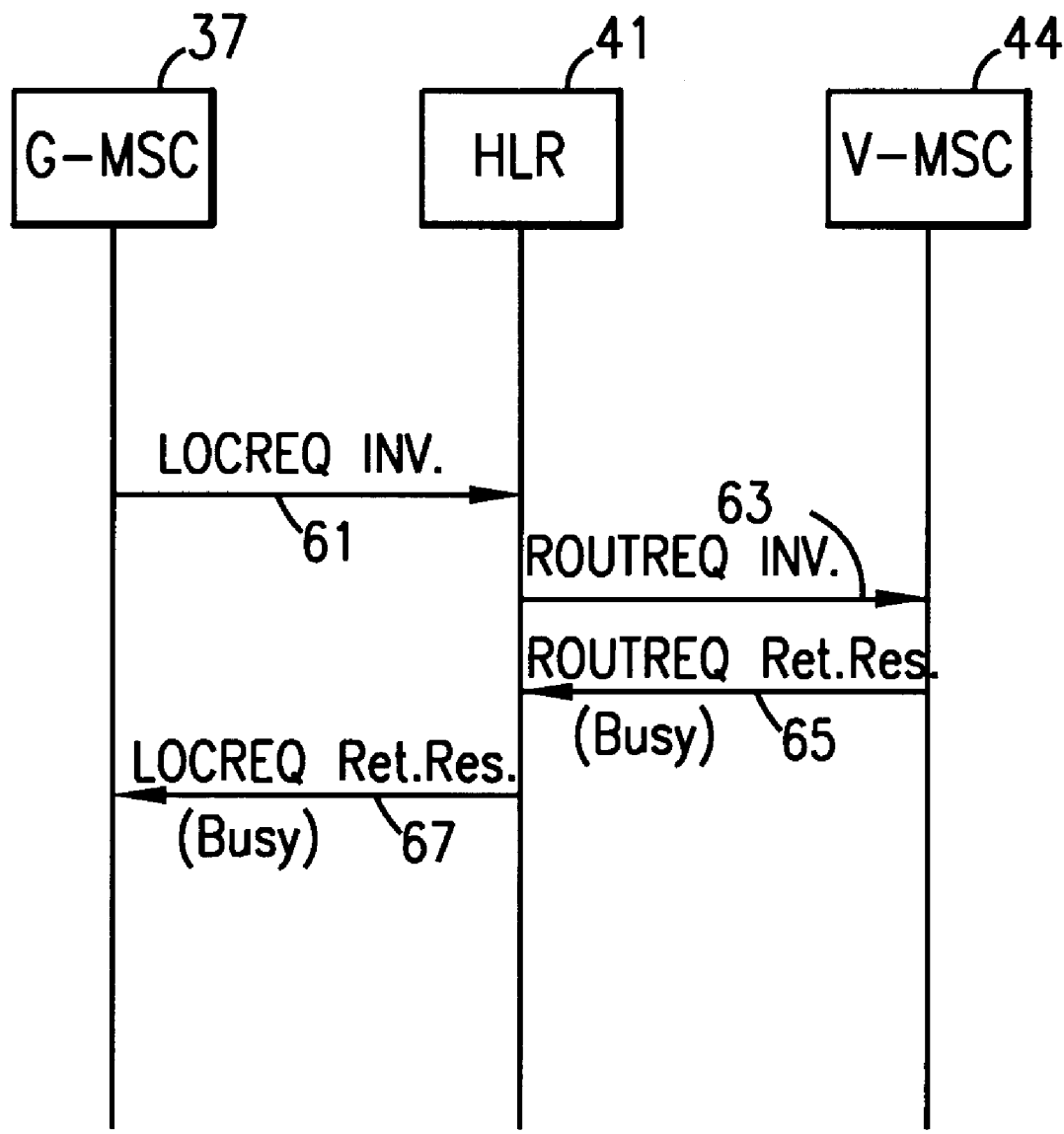
FIGS. 3A and 3B are signaling diagrams illustrating the query process for determining a busy status of a mobile station.
Figure 3B:
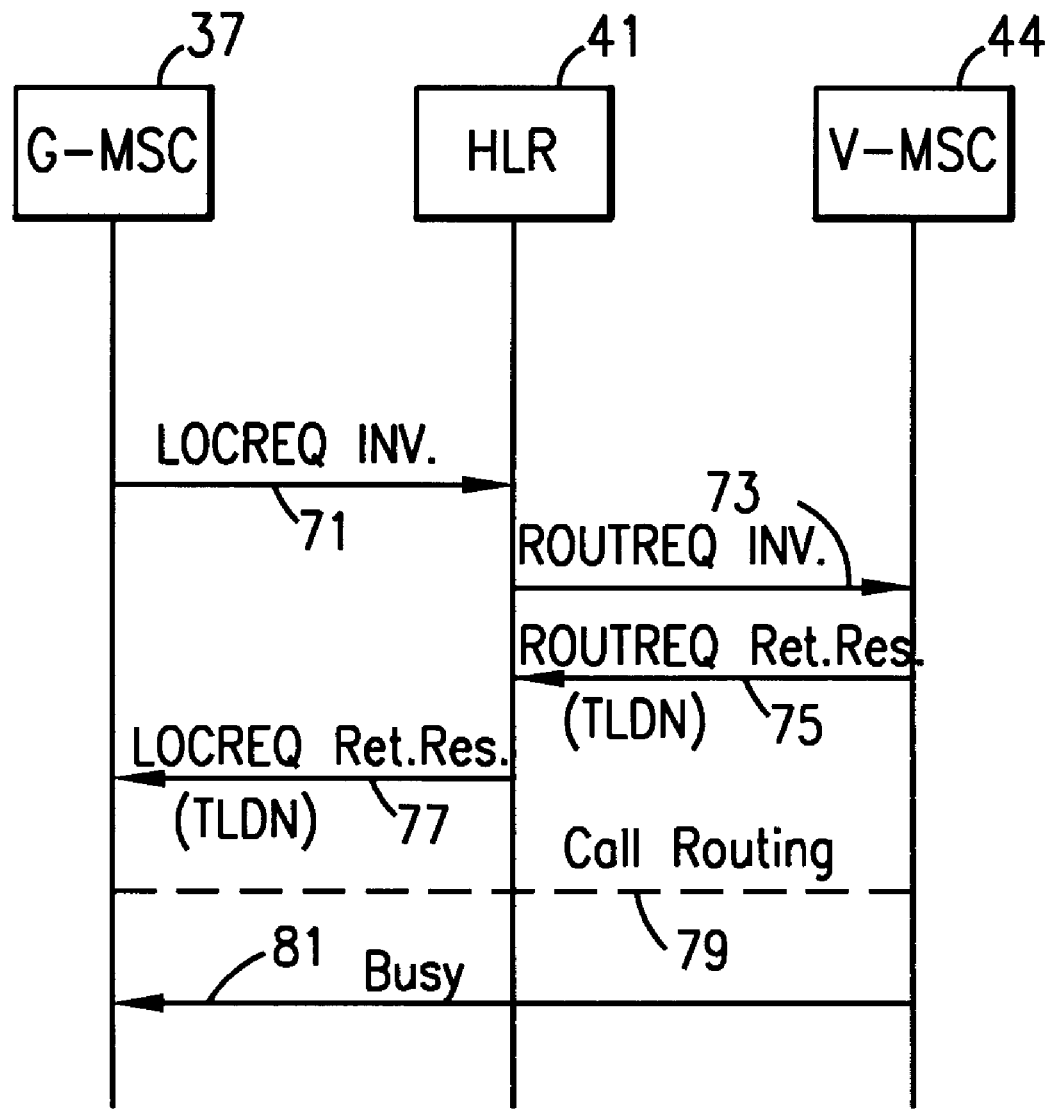

FIGS. 3A and 3B are signaling diagrams illustrating the query process for determining a busy status of the MS 46. In FIG. 3A, the G-MSC 37 may determine whether the MS 46 is busy by initiating a Location Request (LOCREQ) Invoke message 61 to the HLR 41. The HLR 41 then sends a Route Request (ROUTREQ) Invoke message 63 to the V-MSC 44. The V-MSC 44 detects that the MS 46 is busy and responds to the ROUTREQ Invoke message 63 with a ROUTREQ Return Result message 65 indicating the MS 46 is busy to the HLR 41. The HLR 41 sends a LOCREQ Return Result message 67 to the G-MSC 37 and includes the status of the MS 46.

Referring now to FIG. 3B, the G-MSC 37 could alternately determine if the MS 46 is busy when the G-MSC 37 attempts call delivery to the V-MSC 44 via the trunk 49. This may occur if the MS 46 becomes busy after the V-MSC 44 sends a ROUTREQ Return Result message reporting that the MS 46 is idle. For example, the G-MSC 37 initiates a Location Request (LOCREQ) Invoke message 71 to the HLR 41. The HLR 41 then sends a Route Request (ROUTREQ) Invoke message 73 to the V-MSC 44. The V-MSC 44 detects that the MS 46 is idle and responds to the ROUTREQ Invoke message 73 with a ROUTREQ Return Result message 75 indicating the TLDN for the idle MS 46 to the HLR 41. The HLR 41 then sends a LOCREQ Return Result message 77 with the TLDN to the G-MSC 37. Next, the G-MSC 37 attempts call routing 79 to the V-MSC 44. In this example, during the interim period between the return of the idle status of the MS 46 and the call routing 79, the MS 46 becomes busy. The V-MSC 44 then returns a busy signal 81 to the G-MSC 37, thereby informing the G-MSC 37 of the busy status of the MS 46.

Figure 4A:
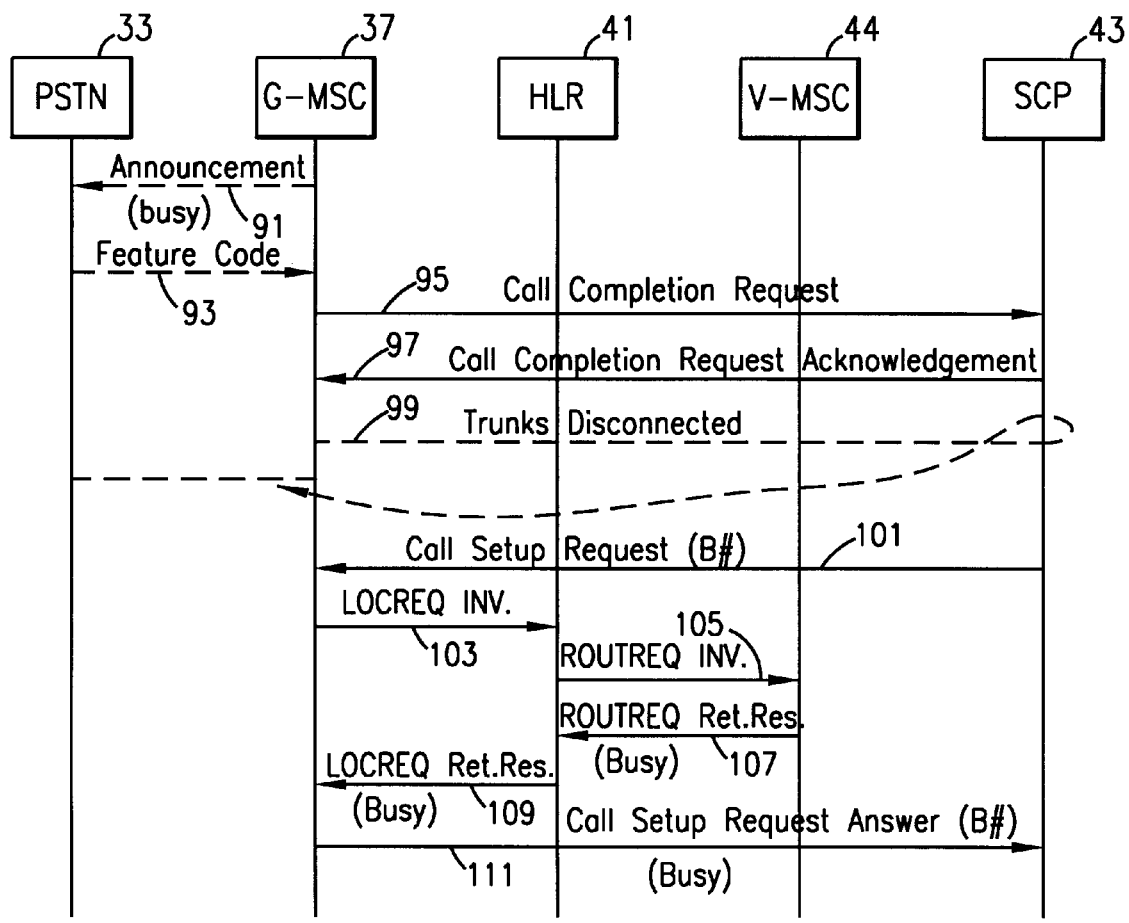
FIGS. 4A and 4B are signaling diagrams illustrating the call completion to a busy mobile station.
Figure 4B:
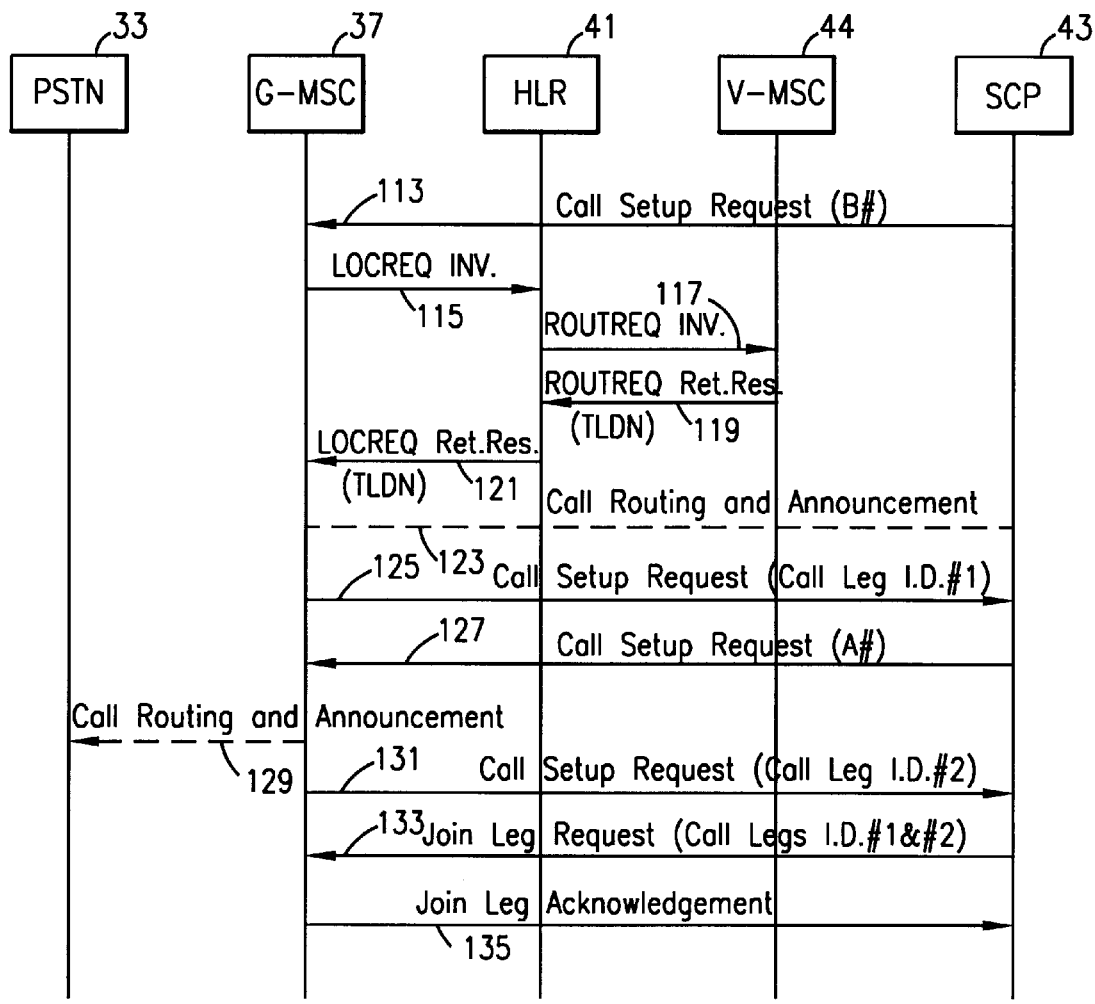

FIGS. 4A and 4B are signaling diagrams illustrating the call completion to a busy mobile station. Referring to FIGS. 2, 4A, and 4B, after the G-MSC 37 determines that the MS 46 is busy, as depicted in the signaling process depicted in FIGS. 3A and 3B, an announcement 91 is given to the calling party via the PSTN 33, by the announcement machine 38, instructing him that a request for call completion may be made. The calling party may initiate a feature request 93 for call completion, by entering a code, for example, *66, to activate the service. Additionally, the A-number (calling party's number) and the B-number (MS 46's number) are entered with the request for call completion. This request is sent from the PSTN 33 to the G-MSC 37. The G-MSC 37 then sends a call completion request 95 to the SCP 43 requesting the call completion. Once the request for call completion request 95 reaches the SCP 43, the SCP 43 returns a call completion request acknowledgement message 97 to the G-MSC 37. Additionally, all trunks are released at 99. In particular, the trunk between the PSTN 33 and the G-MSC 37 and the trunk from the G-MSC 37 to the V-MSC 44 (if used, i.e., MS 46 roams outside the home coverage area 35), are released.

Periodically, over a time period and at a frequency set by the network operator, the SCP 43, through service logic installed within the SCP 43, initiates a call setup request via the G-MSC 37 with the assistance of the SSF 39. This call attempt starts a query process to determine if the MS 46 is busy. In the first example, the SCP 43 sends a call setup request 101 to the G-MSC 37 for the B-number. The query process includes sending a LOCREQ Invoke message 103 from the G-MSC 37 to the HLR 41, followed by the HLR 41 sending a ROUTREQ Invoke message 105 to the V-MSC 44. In this first query example, the V-MSC 44 sends a ROUTREQ Return Result message 107 to the HLR 41 indicating the busy status of the MS 46. The HLR 41 then sends a LOCREQ Return Result message 109 indicating the busy status of the MS 46 to the G-MSC 37. The G-MSC 37 sends a call setup request answer 111 for the B-number (MS 46) to the SCP 43. Each query's result is sent from the SSF 39 to the SCP 43. If the MS 46 continues to be busy, the SCP 43 initiates a call attempt again after a predetermined time period. A threshold time period can be set to determine how long the query process continues. For example, 15 minutes may be the limit established by the network operator for which the callback may take place from when the call completion request is made. In addition, the calling party may have the option of canceling the automatic callback request, by inputing a code, such as *55.

In another query, the SCP 43 sends a call setup request 113 (B-number) to the G-MSC 37. The G-MSC 37 sends a LOCREQ Invoke message 115 to the HLR 41. The HLR 41 then sends a ROUTREQ Invoke message 117 to the V-MSC 44. Upon detecting that the MS 46 is idle, the V-MSC 44 sends a ROUTREQ Return Result message 119 with a TLDN to the HLR 41. The HLR 41 sends a LOCREQ Return Result 121 with the TLDN to the G-MSC 37. The G-MSC 37 routes the call and sends an announcement at 123. The MS 46 is alerted and the answering subscriber is then informed to wait for a call completion. The MS 46 may be informed by a verbal announcement or be an aural warning (e.g., tone, beep, or ring) from the announcement machine 45 located within the V-MSC 44. Next, the G-MSC 37 sends a call setup request 125 to the SCP 43. The SCP 43 establishes a trunk 47 (called Leg I.D. #1) between the G-MSC 37 and the V-MSC 44. Next, the SCP 43 sends a call setup request 127 for the A-number to the G-MSC 37. The G-MSC 37 routes the call and sends an announcement to the calling party via the PSTN 33 at 129. The announcement informs the calling party to wait for a call completion. This announcement may be verbal or another type of aural warning from the announcement machine 38. The G-MSC 37 then sends a call setup request 131 to the SCP 43. The 5 SCP 43 establishes the trunk 47 (called Leg I.D. #2) from the G-MSC 37 to the PSTN 33. The SCP 43 sends a Join Leg Request message 133 to the G-MSC 37 commanding the joining of the Leg I.D. #1 and #2. The G-MSC 37 joins the Leg I.D. #1 and #2 together and sends a Join Leg Acknowledgement message 135 to the SCP 43.

Figure 5:
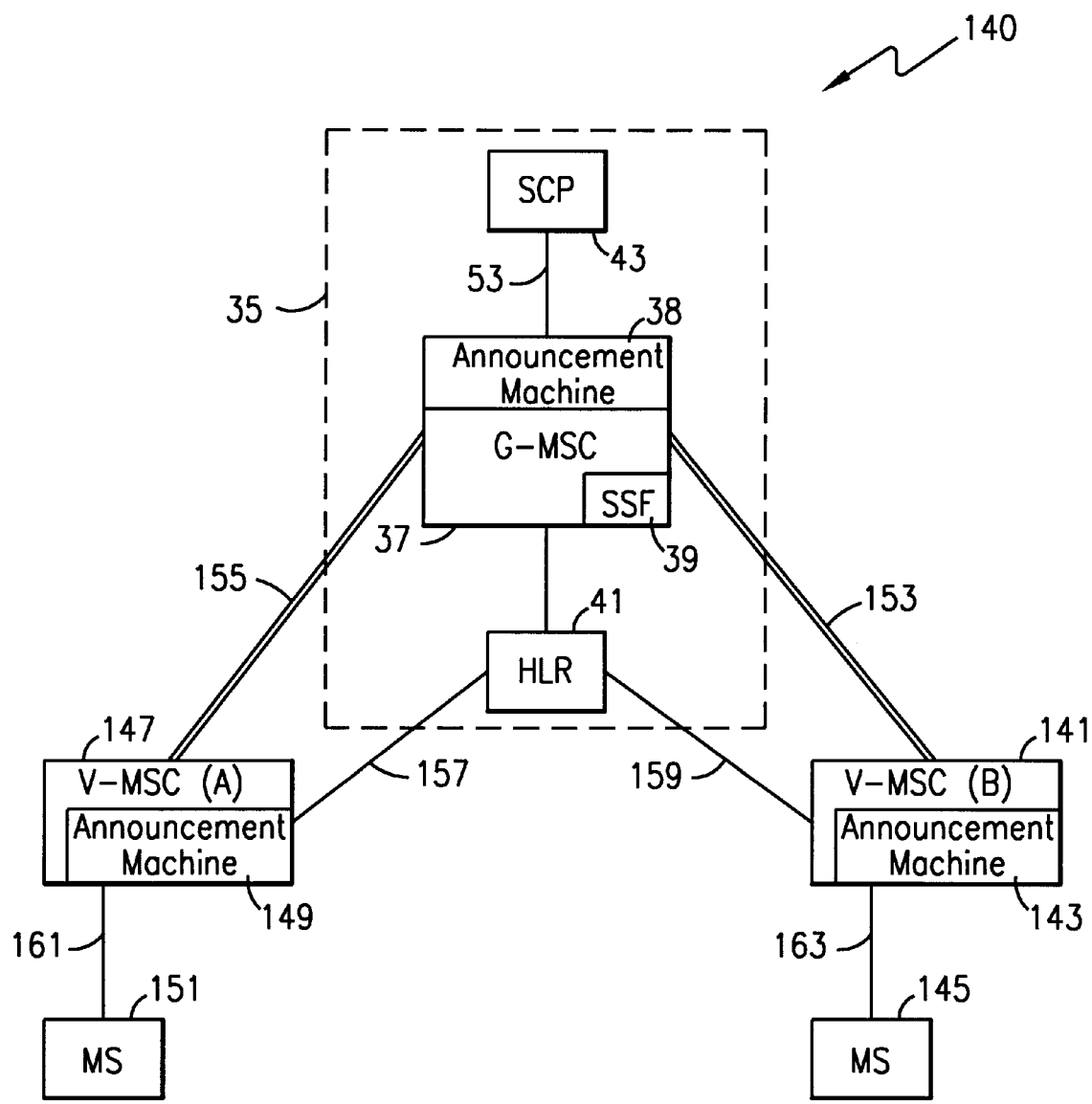
FIG. 5 is a simplified block diagram illustrating the components of a telecommunications system in another embodiment of the present invention.

FIG. 5 is a simplified block diagram illustrating the components of a telecommunications system in another embodiment of the present invention. The telecommunications system 140 includes a home service area 35 associated with a G-MSC 37, an announcement machine 38, a service switching function (SSF) 39, a HLR 41, and a Service Control Point (SCP) 43. Additionally, the system 140 includes a V-MSC(A) 147 having an announcement machine 149, a MS 151, a V-MSC(B) 141 having an announcement machine 143, a MS 145, trunks 153–155, and communications links 53, 157–163.

The home service area 35 is the service area associated with the G-MSC 37 from which the MS 145 originates. The MS 145 may or may not be within the home service area 35. As depicted in FIG. 5, the MS 145 has roamed outside the home service area 35. Since the MS 145 has roamed outside the home service area 35, the MS 145 is serviced by the V-MSC(B) 141. However, if the MS 145 was still within the home service area 35, the MS 145 would be serviced by the G-MSC 37 and the V-MSC(B) would not be needed. Additionally, the MS 151, the calling party, may or may not be within the home service area 35. As depicted in FIG. 5, the MS 151 has roamed outside of the home service area 35. The MS 151 is serviced by the V-MSC(A) 147. However, if the MS 151 goes into the home service area 35, the V-MSC (A) 147 is not needed. The system 140 is very similar to the system 31 depicted in FIG. 2 except the calling party is not connected through the PSTN 33, but rather is a mobile station which could be either inside or outside the home service area 35.

Figure 6A:
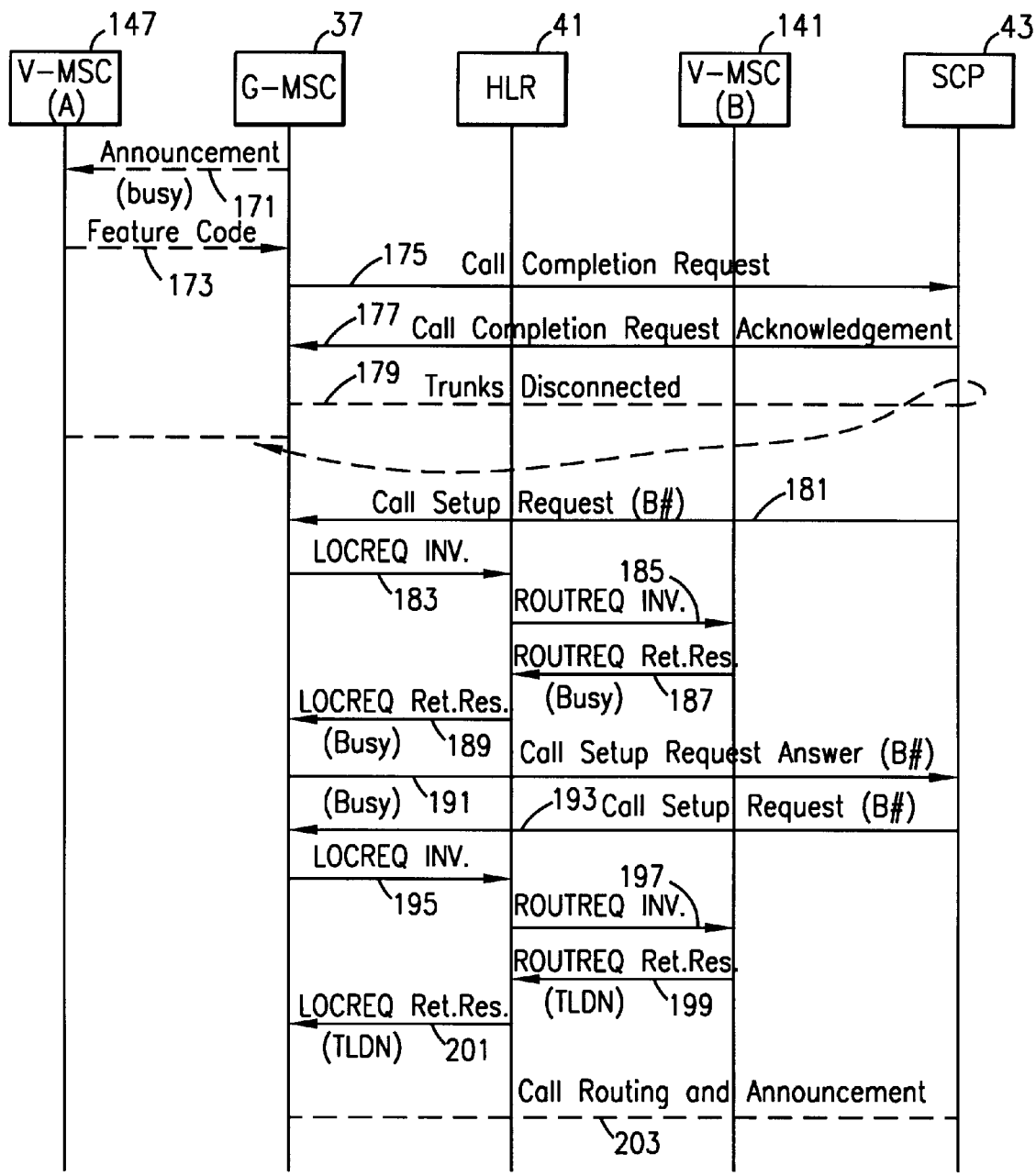
FIGS. 6A and 6B are signaling diagrams illustrating the call completion from a mobile station to a busy mobile station.
Figure 6B:
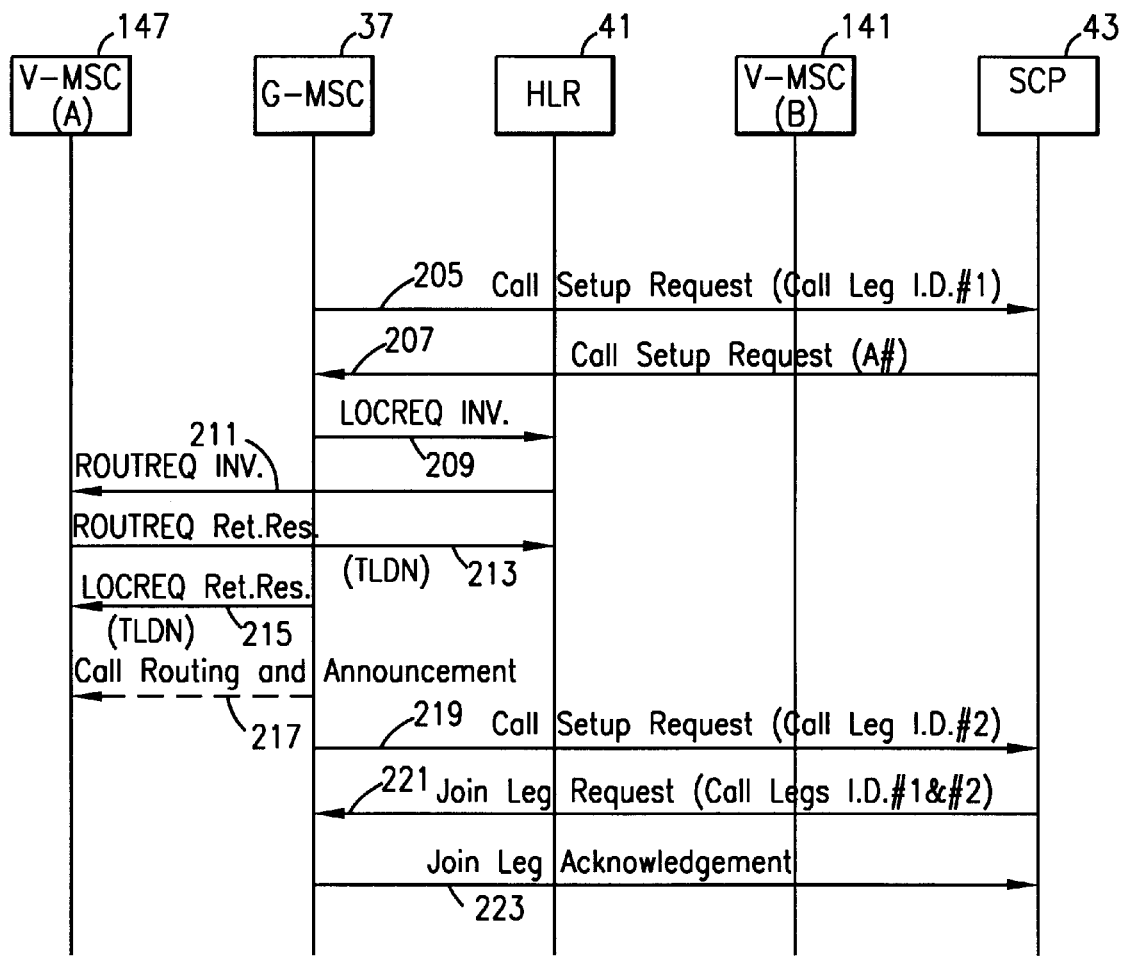

FIGS. 6A and 6B are signaling diagrams illustrating the call completion from a mobile station to a busy mobile station process. Referring to FIGS. 5, 6A, and 6B, after the G-MSC 37 determines that the MS 145 is busy, an announcement 171 is given to the calling party via the V-MSC(A), by the announcement machine 149, instructing him that a request for call completion may be made. The calling party may initiate a feature request 173 for call completion, by entering a code, for example, *66, to activate the service. Additionally, the A-number (calling party's number) and the B-number (MS 145's number) are entered with the request for call completion. This request is sent from the V-MSC(A) 147 to the G-MSC 37. The G-MSC 37 then sends a call completion request 175 to the SCP 43 requesting the call completion. Once the request for call completion request 175 reaches the SCP 43, the SCP 43 sends a call completion request acknowledgement 177 to the G-MSC 37. Additionally, all trunks are released at 179. In particular, the trunk between the V-MSC(A) 147 and the G-MSC 37 (if used) and the trunk from the G-MSC 37 to the V-MSC(B) 141 (if used), are released.

Periodically, over a time period and at a frequency set by the network operator, the SCP 43, through service logic installed within the SCP 43, initiates a call setup request via the G-MSC 37 with the assistance of the SSF 39. This call attempt starts a query process to determine if the MS 145 is busy. In the first example, the SCP 43 sends a call setup request 181 to the G-MSC 37 for the B-number. The query process includes sending a LOCREQ Invoke message 183 from the G-MSC 37 to the HLR 41, and the HLR 41 sending a ROUTREQ Invoke message 185 to the V-MSC(B) 141. In this first query example, the V-MSC(B) 141 sends a ROUTREQ Return Result message 187 to the HLR 41 indicating the busy status of the MS 145. The HLR 41 then sends a LOCREQ Return Result message 189 indicating the busy status of the MS 145 to the G-MSC 37. The G-MSC 37 sends a call setup request answer 191 for the B-number (MS 145) to the SCP 43. Each query's result is sent from the SSF 39 to the SCP 43. If the MS 145 continues to be busy, the SCP 43 initiates a call attempt again after a predetermined time period. A threshold time period can be set to determine how long the query process continues. For example, 15 minutes may be the limit established by the network operator for which the callback may take place from when the call completion request is made. In addition, the calling party may have the option of canceling the automatic callback request, by inputing a code, such as *55.

In another query, the SCP 43 sends a call setup request 193 (B-number) to the G-MSC 37. The G-MSC 37 sends a LOCREQ Invoke message 195 to the HLR 41. The HLR 41 then sends a ROUTREQ Invoke message 197 to the V-MSC (B) 141. Upon detecting that the MS 145 is idle, the V-MSC(B) 141 sends a ROUTREQ Return Result message 199 with a TLDN to the HLR 41. The HLR 41 sends a LOCREQ Return Result 201 with the TLDN to the G-MSC 37. The G-MSC 37 routes the call and sends an announcement at 203. The MS 145 is alerted and the answering subscriber is then informed to wait for a call completion. The MS 145 may be informed by a verbal announcement or by an aural warning (e.g., tone, beep, or ring) from the announcement machine 143 located within the V-MSC(B) 141. Next, the G-MSC 37 sends a call setup request 125 to the SCP 43. The SCP 43 establishes a trunk 153 (called Leg I.D. #1) between the G-MSC 37 and the V-MSC(B) 141. Next, the SCP 43 sends a call setup request 207 for the A-number to the G-MSC 37. The G-MSC 37 sends a LOCREQ Invoke message 209 to the HLR 41. The HLR 41 then sends a ROUTREQ Invoke message 211 to the V-MSC (A) 147. The V-MSC(A) responds by sending a ROUTREQ Return Result message 213 with a TLDN to the HLR 41. The HLR 41 responds by ending a LOCREQ Return Result 215 with the TLDN to the G-MSC 37. The query process to determine the location of the MS 151 is only necessary if the MS 151 roams outside the home coverage area 35. As depicted in FIG. 5, the MS 151 has roamed outside the home coverage area 35. Next, the G-MSC 37 routes the call and sends an announcement to the calling party via the V-MSC (A) 147 at 217. The announcement informs the calling party to wait for a call completion. This announcement may be verbal or another type of aural warning from the announcement machine 149. The G-MSC 37 then sends a call setup request 219 to the SCP 43. The SCP 43 establishes the trunk 155 (called Leg I.D. #2) from the G-MSC 37 to the V-MSC (A) 147. The SCP 43 sends a Join Leg Request message 221 to the G-MSC 37 commanding the joining of the Leg I.D. #1 and #2. The G-MSC 37 joins the Leg I.D. #1 and #2 together and sends a Join Leg Acknowledgement message 223 to the SCP 43.

Figure 7A:
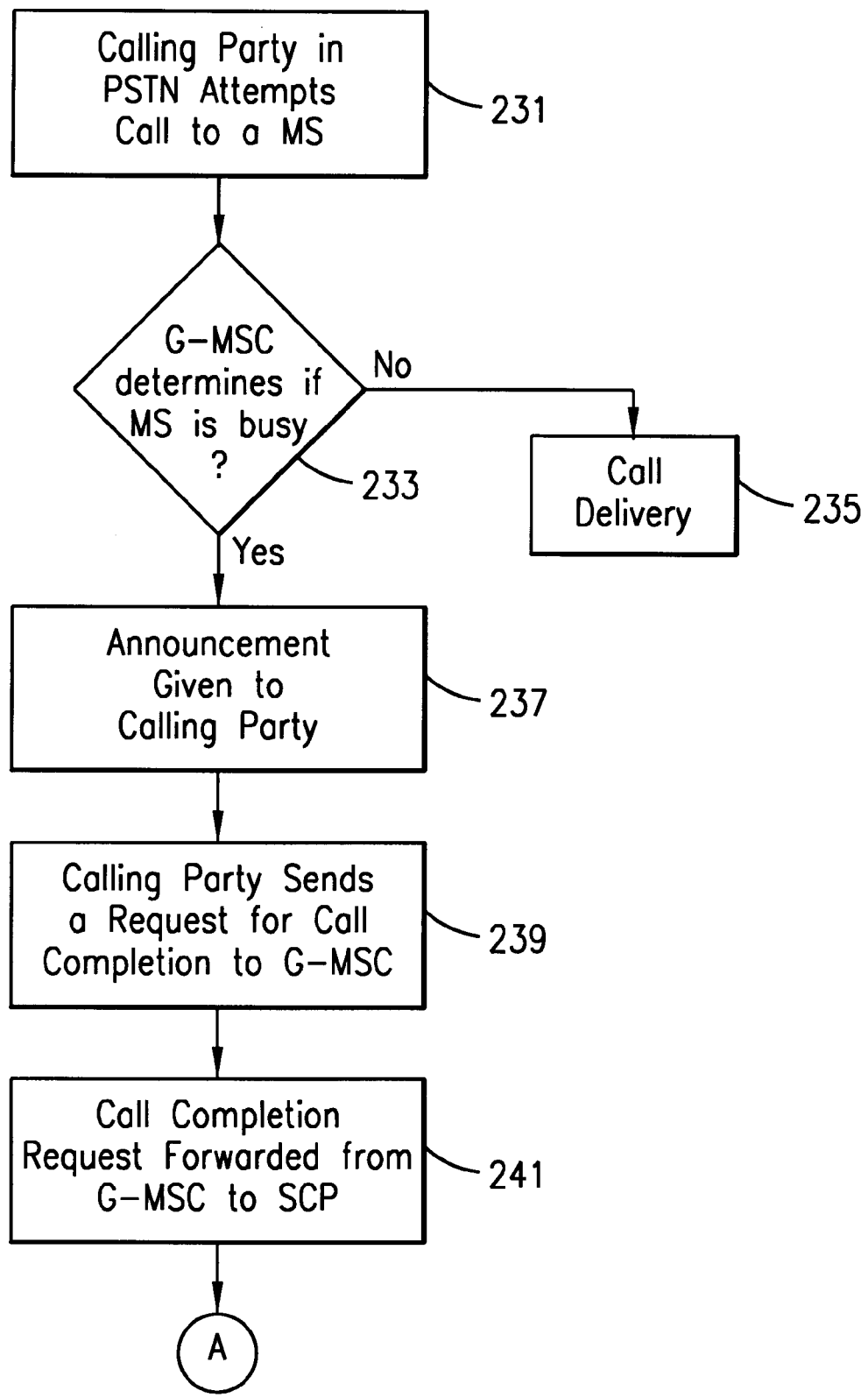
FIGS. 7A–7C are flow charts outlining the steps of the method of the present invention for call completion to a busy mobile subscriber according to the teachings of the present invention.
Figure 7B:
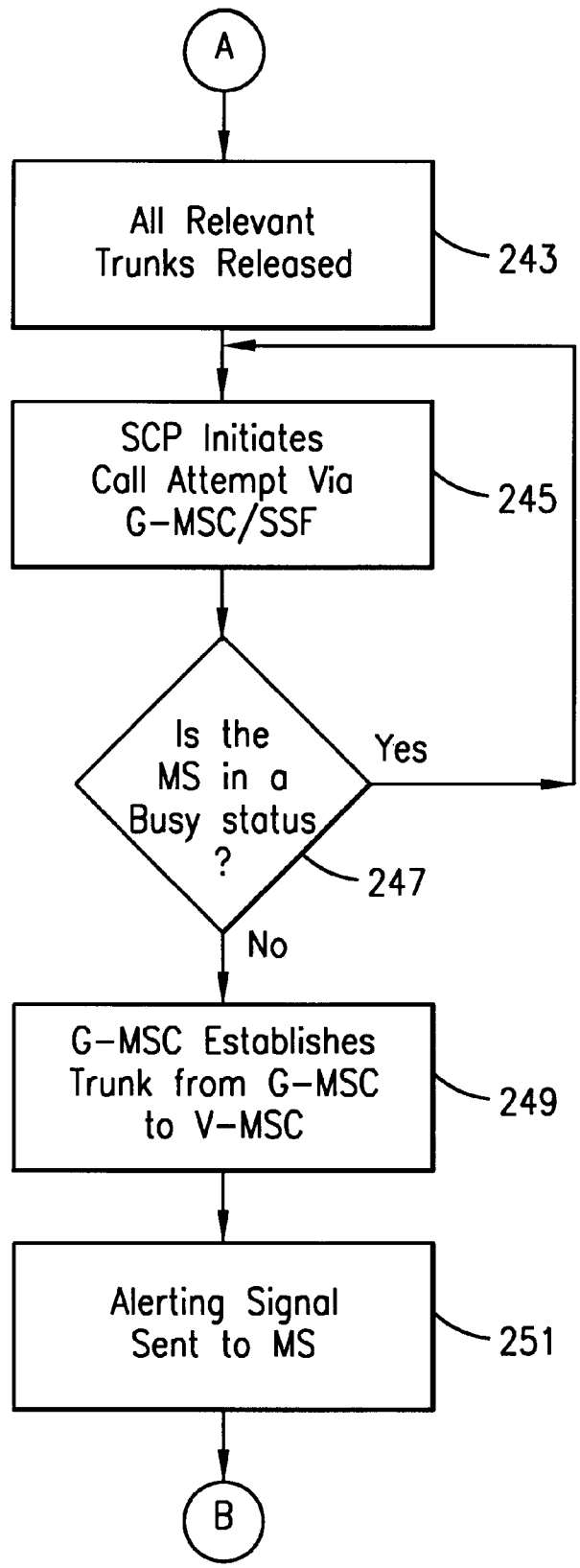
Figure 7C:
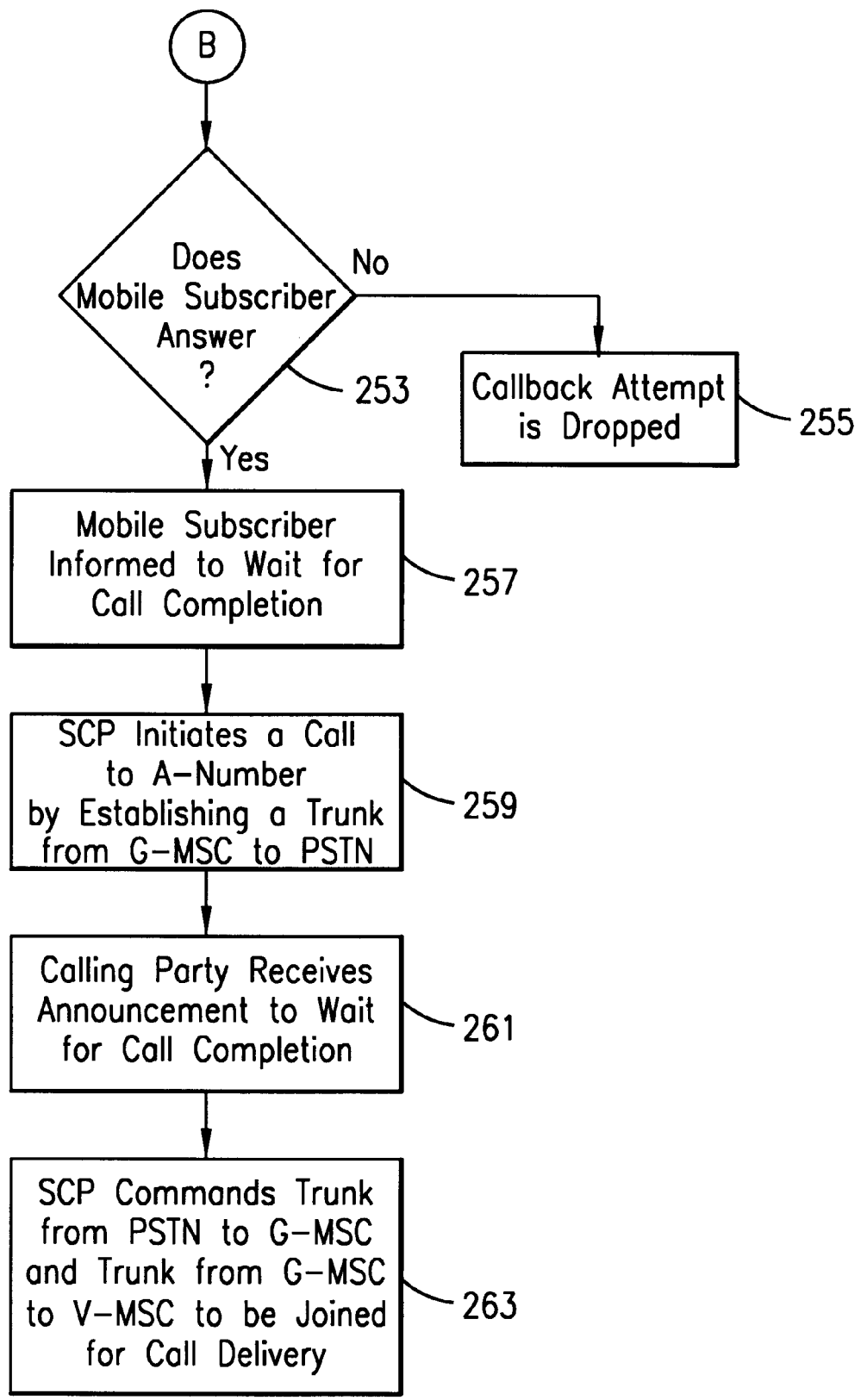

FIGS. 7A–7C are flow charts outlining the steps of the method of the present invention for call completion to a busy mobile subscriber according to the teachings of the present invention. Referring to FIGS. 2, 3A, 3B, 4A, 4B, 7A, 7B, and 7C, the method will now be described. The method begins at step 231, by a calling party in the PSTN 33 attempting to call a MS 46. As discussed before, the calling party may also be a mobile station within the PLMN, however in this embodiment, the calling party is utilizing the PSTN 33. Additionally, the MS 46 may still be within the home coverage area 35, thereby removing the requirement for the V-MSC 44. In step 233, the G-MSC 37 determines if the MS 46 is busy. One way the G-MSC 37 can determine if the MS 46 is busy is by the G-MSC 37 sending a LOCREQ Invoke message 61 to the HLR 41. The HLR 41, in turn, sends a ROUTREQ Invoke message 63 to the V-MSC 44. The V-MSC 44 detects when the MS 46 is busy and sends a ROUTREQ Return Result message 65 to the HLR 41 indicating that the MS 46 is busy. The HLR 41 then sends a LOCREQ Return Result message 67 to the G-MSC 37 indicating the busy status of the MS 46.

The G-MSC 37 could alternately determine whether the MS 46 is busy when the G-MSC 37 attempts call delivery to the V-MSC 44 via the trunk 49. This may occur if the MS 46 becomes busy after the V-MSC 44 sends a ROUTREQ Return Result message reporting that the MS 46 is idle. For example, the G-MSC 37 initiates a Location Request (LOCREQ) Invoke message 71 to the HLR 41. The HLR 41 then sends a Route Request (ROUTREQ) Invoke message 73 to the V-MSC 44. The V-MSC 44 detects that the MS 46 is idle and responds to the ROUTREQ Invoke message 73 with a ROUTREQ Return Result message 75 indicating the TLDN for the idle MS 46 to the HLR 41. The HLR 41 then sends a LOCREQ Return Result message 77 with the TLDN to the G-MSC 37. Next, the G-MSC 37 attempts call routing 79 to the V-MSC 44. In this example, during the interim period between the return of the idle status of the MS 46 and the call routing 79, the MS 46 becomes busy. The V-MSC 44 then returns a busy signal 81 to the G-MSC 37, thereby informing the G-MSC 37 of the busy status of the MS 46.

If the G-MSC 37 determines that the MS 46 is idle, the method moves to step 235, where the call is delivered from the calling party to the MS 46. If, however, the G-MSC 37 determines that the MS 46 is busy, the method moves from step 233 to step 237, where an announcement is made to the calling party by the announcement machine 38 informing him that he may request a call completion through the automatic callback service. Next, in step 239, the calling party sends a request for call completion. The call completion request includes a feature code, such as *66, to indicate that the automatic callback service is desired. Additionally, the A-number (the telephone number of the calling party) and the B-number (the number of the MS 46) are included in the call completion request. This call completion request is sent from the PSTN 33 to the G-MSC 37 through the trunk 47. In step 241, the call completion request 95 is forwarded from the G-MSC 37 to the SCP 43. Then, in step 243, the SCP 43 acknowledges the call completion request and commands that all trunks relating to the calling party and the MS 46 be released (i.e., trunk 47 and 49).

Next, in step 245, the SCP 43 periodically initiates a call attempt to the MS 46 through the SSF 39 and the G-MSC 37. The call attempt involves the query process to determine if the MS 46 is busy by the G-MSC 37 sending a LOCREQ Invoke message to the HLR 41. In turn, the HLR 41 sends a ROUTREQ Invoke message to the V-MSC 44. The VMSC 44 determines if the MS 46 is busy and returns this information to the G-MSC 37 and the SCP 43 at step 247, where it is determined if the MS 46 is in a busy status. If it is determined that the MS 46 is busy, the method returns to step 245 and the querying process begins again. The network operator may set a limit on how long the query process will continue. Additionally, the calling party may have the option of canceling the automatic callback service by inputing a code, such as *55.

However, if it is determined that the MS 46 is no longer busy, the method moves from step 247 to step 249, where the G-MSC 37 establishes the trunk 49 (Leg I.D. #1) from the G-MSC 37 to the V-MSC 44. Next, in step 251, the V-MSC 44 sends an alerting signal to the MS 46 to answer. The mobile subscriber typically answers by picking up the MS 46 and pressing a receive button. Then, in step 253, it is determined if the mobile subscriber answers. If it is detected that the MS 46 does not answer the alert, the method moves to step 255 where the callback attempt is dropped. However, if it is detected that the mobile subscriber answers, the method moves from step 253 to step 257 where the mobile subscriber is informed by an announcement to wait for a call completion. The announcement may take the form of a verbal announcement or by an aural announcement (e.g., tone, ring, or click) from the announcement machine 45 located within the V-MSC 44. Next, in step 259, the SCP 43 initiates a call setup request 131 to the given A-number where the calling party is located by establishing the trunk 47 (Leg I.D. #2) from the G-MSC 37 to the PSTN 33. In step 261, the calling party receives an announcement informing the calling party to wait for a call completion. The announcement may be a verbal announcement or an aural warning from the announcement machine 38. In step 263, the SCP 43 commands that the trunk between the PSTN 33 and the G-MSC 37 and the trunk between the G-MSC 37 and the V-MSC 44 be joined for call delivery.

Figure 8A:
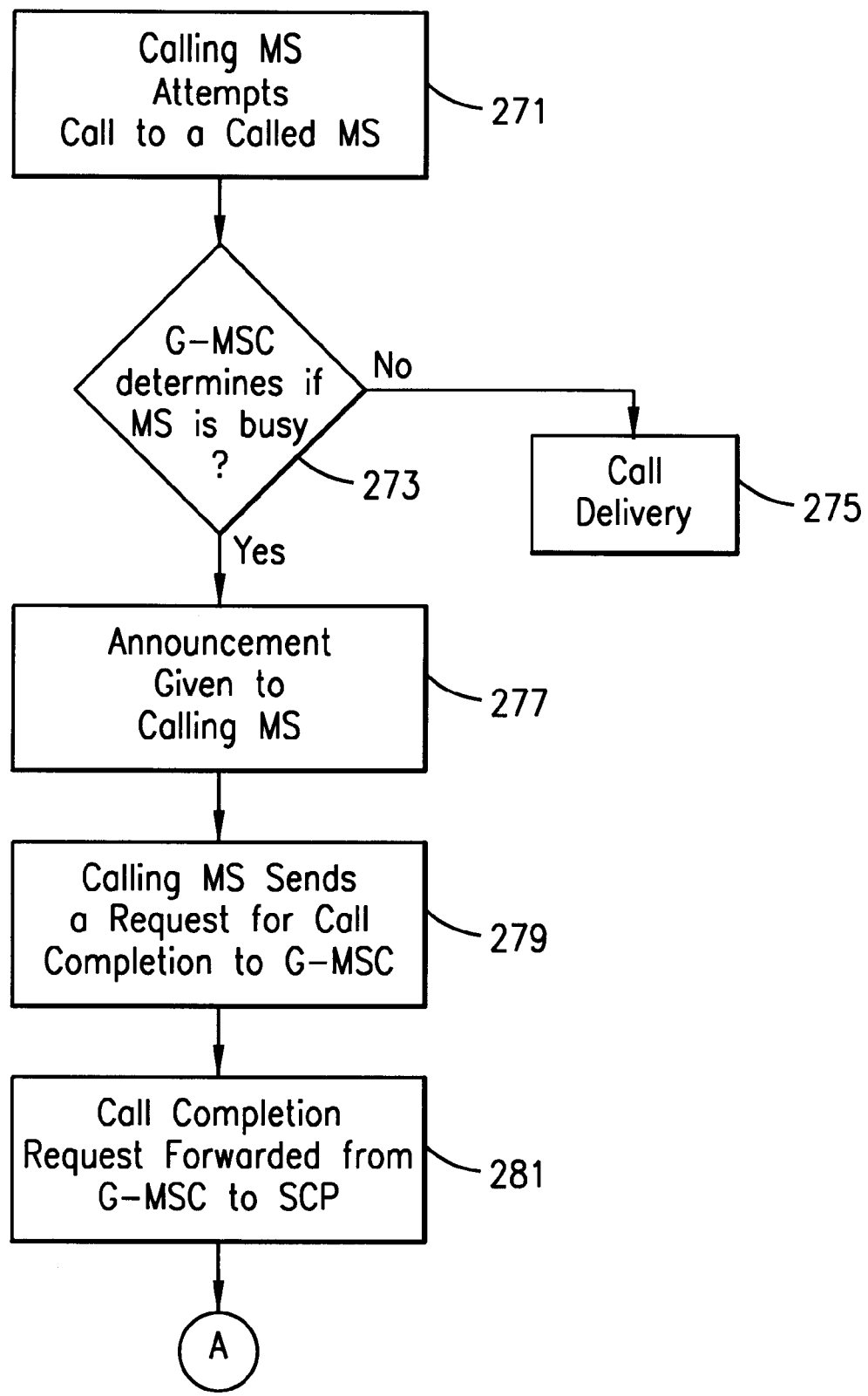
FIGS. 8A–8C are flow charts outlining the steps of the method of the present invention for call completion from a mobile station to a busy mobile subscriber according to the teachings of the present invention.
Figure 8B:
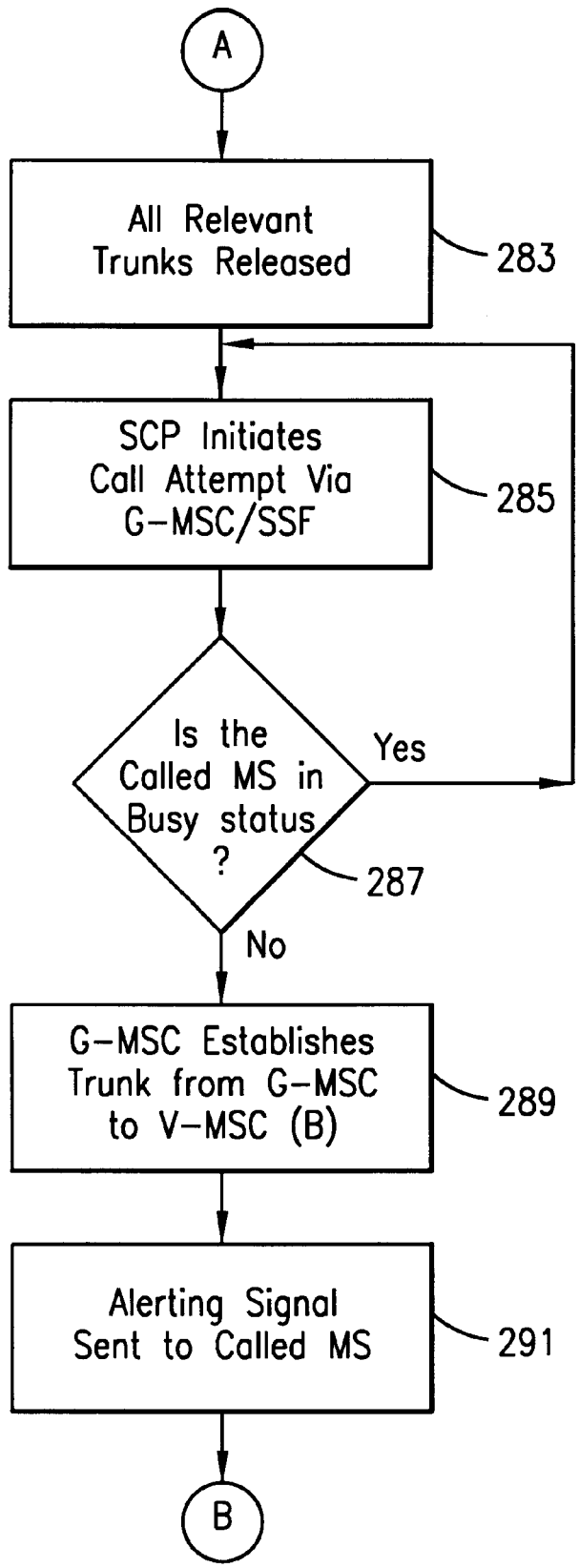
Figure 8C:
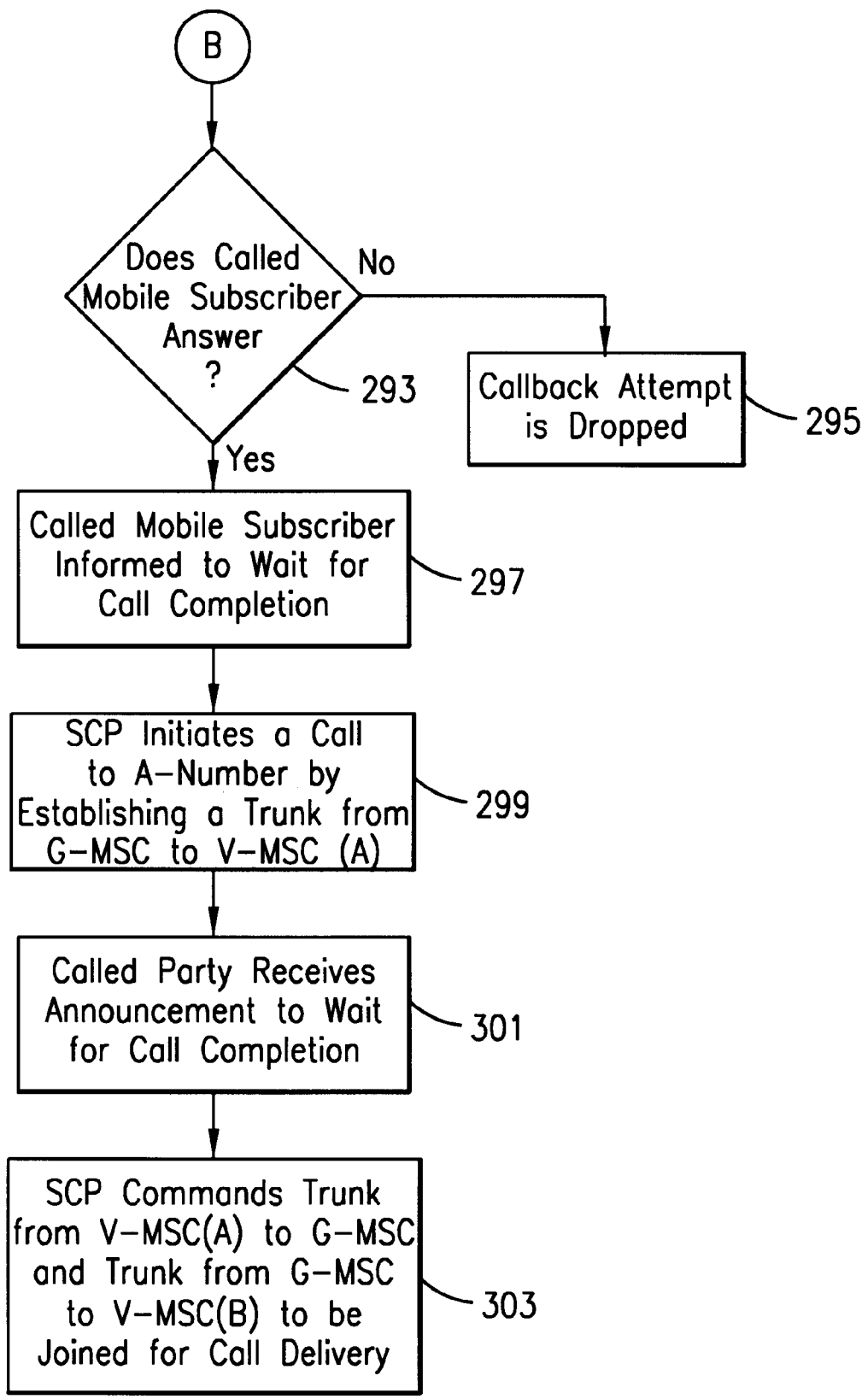

FIGS. 8A–8C are flow charts outlining the steps of the method of the present invention for call completion from a mobile station to a busy mobile subscriber according to the teachings of the present invention. Referring to FIGS. 5, 6A, 6B, 8A, 8B, and 8C, the method will now be described. The method begins at step 271, by a calling party attempting to call a MS 145. In this embodiment, the calling party is a mobile station. The mobile station (MS 151) may or may not be in the home coverage area 35. If the MS 151 is outside the home coverage area 35, a V-MSC(A) 147 is required. Additionally, the MS 145 may still be within the home coverage area 35, thereby removing the need for the V-MSC (B) 141. In step 273, the G-MSC 37 determines if the MS 145 is busy. One way the G-MSC 37 can determine if the MS 46 is busy is by the G-MSC 37 sending a LOCREQ Invoke message to the HLR 41. The HLR 41, in turn, sends a ROUTREQ Invoke message to the V-MSC(B) 141. The V-MSC(B) 141 detects when the MS 145 is busy and sends a ROUTREQ Return Result message to the HLR 41 indicating that the MS 145 is busy. The HLR 41 then sends a LOCREQ Return Result message to the G-MSC 37 indicating the busy status of the MS 145.

The G-MSC 37 could alternately determine whether the MS 145 is busy when the G-MSC 37 attempts call delivery to the V-MBC(B) 141 via the trunk 153. This may occur if the MS 145 becomes busy after the V-MSC(13) 141 sends a ROUTREQ Return Result message reporting that the MS 145 is idle. For example, the G-MSC 37 initiates a Location Request (LOCREQ) Invoke message to the HLR 41. The HLR 41 then sends a Route Request (ROUTREQ) Invoke message to the V-MSC(B) 141. The V-MSC(B) 141 detects that the MS 145 is idle and responds to the ROUTREQ Invoke message with a ROUTREQ Return Result message indicating a TLDN for the idle MS 145 to the HLR 41. The HLR 41 then sends a LOCREQ Return Result message with the TLDN to the G-MSC 37. Next, the G-MSC 37 attempts call routing to the V-MSC(B) 141. In this example, during the interim period between the return of the idle status of the MS 145 and the call routing, the MS 145 becomes busy. The V-MSC(B) 141 then returns a busy signal to the G-MSC 37, thereby informing the G-MSC 37 of the busy status of the MS 145.

If the G-MSC 37 determines that the MS 145 is idle, the method moves to step 275, where the call is delivered from the MS 151 to the MS 145. If, however, the G-MSC 37 determines that the MS 145 is busy, the method moves from step 273 to step 277, where an announcement is made to the calling mobile subscriber by the announcement machine 149 informing him that he may request a call completion through the automatic callback service. Next, in step 279, the MS 151 sends a request for call completion. The call completion request includes a feature code, such as *66, to indicate that the automatic callback service is desired. Additionally, the A-number (the telephone number of the MS 151) and the B-number (the number of the MS 145) are included in the call completion request. This call completion request is sent from the MS 151 to the G-MSC 37 through the trunk 155. In step 281, the call completion request 175 is forwarded from the G-MSC 37 to the SCP 43. Then, in step 283, the SCP 43 acknowledges the call completion request and commands that all trunks relating to the MS 151 and the MS 145 be released (i.e., trunk 153 and 155).

Next, in step 285, the SCP 43 periodically initiates a call attempt to the MS 145 through the SSF 39 and the G-MSC 37. The call attempt involves a query process to determine if the MS 145 is busy by the G-MSC 37 sending a LOCREQ Invoke message 183 to the HLR 41. In turn, the HLR 41 sends a ROUTREQ Invoke message 185 to the V-MSC(B) 141. The V-MSC(B) 141 determines if the MS 145 is busy and returns this information to the G-MSC 37 and the SCP 43 at step 287, where it is determined if the MS 145 is in a busy status. If it is determined that the MS 145 is busy, the method returns to step 285 and the querying process begins again. The network operator may set a limit on how long the query process will continue. Additionally, the MS 151 may have the option of canceling the automatic callback service by inputing a code, such as *55.

However, if it is determined that the MS 145 is no longer busy, the method moves from step 287 to step 289, where the G-MSC 37 establishes the trunk 153 (Leg I.D. #1) from the G-MSC 37 to the V-MSC(B) 141. Next, in step 291, the V-MSC(B) 141 sends an alerting signal to the MS 145 to answer. The mobile subscriber typically answers by picking up the MS 145 and pressing a receive button. Then, in step 293, it is determined if the mobile subscriber answers. If it is detected that the MS 46 does not answer the alert, the method moves to step 295 where the callback attempt is dropped. However, if it is detected that the mobile subscriber answers, the method moves from step 293 to step 297 where the mobile subscriber is informed by an announcement to wait for a call completion. The announcement may take the form of a verbal announcement or by an aural announcement (e.g., tone, ring, or click) from the announcement machine 143 located within the V-MSC(B) 141. Next, in step 299, the SCP 43 initiates a call setup request 207 to the given A-number where the MS 151 is located by establishing the trunk 155 (Leg I.D. #2) from the G-MSC 37 to the V-MSC (A) 147. In step 301, the MS 151 receives an announcement informing the calling party to wait for a call completion. The announcement may be a verbal announcement or an aural warning from the announcement machine 149. In step 303, the SCP 43 commands that the trunk between the V-MSC(A) 147 and the G-MSC 37 and the trunk between the G-MSC 37 and the V-MSC(B) 141 be joined for call delivery.

There are several advantages to the system and method of the present invention as compared to the existing system 1 (FIG. 1). First, since the system and method are utilizing the IN, the impact necessary to implement and use the automatic callback service in a radio telecommunications network is minimized. Unlike the existing system which requires changes to both the MSC/VLR 15 and the LE 7, the only changes necessary take place within the home service area 35, through software changes in the G-MSC 37, the SSF 39, and the SCP 43. In addition, the utilization of the trunks within the system of the present invention are reduced from the existing system. In existing system 1, trunks were maintained during the entire automatic callback process. However, in the present invention, the trunks are released upon detection of the busy status of the called mobile station. The trunks are only reestablished upon detecting the idle state of the called mobile station.

It is thus believed that the operation and construction of the present invention will be apparent from the foregoing description. While the method and system shown and described have been characterized as being preferred, it will be readily apparent that various changes and modifications could be made therein without departing from the spirit and scope of the invention as defined in the following claims

What is claimed is:

1. A system in a radio telecommunications network for completing a call from a calling party to a called mobile station (MS) which is busy when said call is first attempted, said system comprising:

an originating mobile switching center (O-MSC) where said call enters said radio telecommunications network, said O-MSC including a service switching function (SSF);

a visiting mobile switching center (V-MSC) where said called MS is operating, said V-MSC including means for determining whether said called (MS) is busy;

means for notifying said O-MSC whether said called MS is busy;

a service control function (SCF) associated with said O-MSC, said SCF including service logic for periodically initiating a call attempt to said called MS via said SSF without utilizing a trunk between said O-MSC and said V-MSC;

means within said O-MSC for informing said SCF whether said MS is busy; and means for completing said call upon determining that said called MS is idle.

2. The system for completing a call to a called mobile station (MS) which is busy when said call is first attempted of claim 1 wherein said SCF is located within a service control point (SCP).

3. The system for completing a call to a called mobile station (MS) which is busy when said call is first attempted of claim 2 wherein said means for completing said call upon determining that said called MS is idle includes:

means within said V-MSC for alerting said called MS;

an announcement machine associated with said V-MSC for notifying an answering subscriber to wait for a call completion;

means within said O-MSC for alerting said calling party;

an announcement machine associated with said O-MSC for notifying said calling party to wait for said call completion; and means within said O-MSC for connecting said call.

4. The system for completing a call to a called MS which is busy when said call is first attempted of claim 3 wherein said means within said O-MSC for connecting said call includes means for joining a first trunk between said O-MSC and said V-MSC and a second trunk between said O-MSC and said calling party.

5. The system for completing a call to a called MS which is busy when said call is first attempted of claim 1 wherein said calling party is a wireline subscriber within the Public Switched Telephone Network (PSTN), and said O-MSC is a gateway mobile switching center (G-MSC).

6. The system for completing a call to a called MS which is busy when said call is first attempted of claim 1 wherein said calling party is a calling mobile station (MS).

7. The system for completing a call to a called MS which is busy when said call is first attempted of claim 6 further comprising a second V-MSC where said calling MS is located.

8. A system in a radio telecommunications network for completing a call from a calling party to a called mobile station (MS) which is busy when said call is first attempted, said system comprising:

a mobile switching center (MSC) that performs switching and call connecting functions for said calling party and said called MS, said MSC including means for determining whether said called MS is busy;

means within the MSC for releasing all trunks between the calling party and the called MS upon determining that the called MS is busy;

a service control point (SCP) associated with said MSC, said SCP including service logic for periodically initiating a call attempt to said called MS via said MSC;

means within said MSC for informing said SCP whether said called MS is busy;

signaling means for sending a request for call completion by the calling part to the SCP upon determining that the called MS is busy;

means within the MSC for establishing a first trunk from the MSC to the calling party upon determining that the called MS is idle;

means within the MSC for informing the calling party to wait for call completion; and means within the MSC for completing said call upon determining that said called MS is idle.

9. The system for completing a call to a called mobile station (MS) which is busy when said call is first attempted of claim 8 wherein the MSC includes means for alerting said called MS and said calling party, and the means for informing the calling part to wait for call completion includes an announcement machine associated with said MSC for notifying an answering subscriber and said calling party to wait for call completion.

10. A method in a radio telecommunications network of completing a call from a calling party to a called mobile station (MS) which is busy when said call is first attempted, said MS operating in a service area of a visiting mobile switching center (V-MSC), said method comprising the steps of:

attempting a call by said calling party to said MS;

determining a busy status of said MS by a gateway mobile switching center (G-MSC), said G-MSC having a home service area from which said call enters said radio telecommunications network;

sending a request for call completion by said calling party to a service control point (SCP) associated with said G-MSC, upon determining that said MS is busy;

releasing, by said G-MSC, of all trunks between said calling party and said MS;

periodically initiating, by said SCP, a call attempt to said MS via said G-MSC to determine said busy status of said MS;

determining whether said MS is in said busy status;

establishing a first trunk from said G-MSC to said V-MSC where said MS is operating, upon determining said MS is idle;

sending an alerting signal to said MS;

detecting that said MS answered said alerting signal;

informing said MS to wait for call completion;

establishing a second trunk from said G-MSC to said calling party;

informing said calling party to wait for call completion; and joining said first trunk to said second trunk to establish a call delivery from said calling party to said MS.

11. The method of claim 10, further comprising, after the step of determining a busy status of said MS, the step of announcing to said calling party that an automatic callback service is available to said calling party.

12. The method of claim 11, wherein said step of determining a busy status of said MS includes the step of sending a plurality of messages to determine said busy status of said MS.

13. The method of claim 10, wherein said step of sending a plurality of messages includes the steps of:
   sending a Location Request (LOCREQ) Invoke message from said G-MSC to a home location register (HLR) located in said home service area; and
   sending a Route Request (ROUTREQ) Invoke message from said HLR to said MS.

14. The method of claim 11, wherein the step of sending a request for call completion by said calling party includes the steps of:
   inputing a code to activate said automatic call back service by said calling party;
   sending a first number, by said calling party, indicating a telephone number of said calling party; and
   sending a second number, by said calling party, indicating a telephone number of said MS.

15. The method of claim 11, wherein said step of informing said MS to wait for call completion includes the step of announcing a verbal message, by a first announcement machine associated with said V-MSC, to said MS to wait for call completion.

16. The method of claim 11, wherein said step of informing said calling party to wait for call completion includes the step of announcing a verbal message, by a second announcement machine associated with said G-MSC, to said calling party to wait for call completion.

17. The method of claim 11, wherein said step of informing said calling party to wait for call completion includes the step of sending a series of tones to said calling party to indicate to wait for call completion.

18. A method in a radio telecommunications network of completing a call from a calling party to a called mobile station (MS) which is busy when said call is first attempted, said MS operating in a home service area of a mobile switching center (MSC), said method comprising the steps of:
   attempting a call by said calling party to said MS;
   determining a busy status of said MS by said MSC;
   sending a request for call completion by said calling party to a service control point (SCP) associated with said MSC, upon determining that said MS is busy;
   releasing, by said MSC, of all trunks between said calling party and said MS;
   periodically initiating, by said SCP, a call attempt to said MS via said MSC to determine a busy status of said MS;
   determining whether said MS is in said busy status;
   sending an alerting signal to said MS;
   detecting that said MS answered said alerting signal;
   informing said MS to wait for call completion;
   establishing a first trunk from said MSC to said calling party;
   informing said calling party to wait for call completion; and
   establishing a call delivery from said calling party to said MS.

* * * * *